(12) United States Patent
Wagner et al.

(10) Patent No.: US 9,115,778 B2
(45) Date of Patent: Aug. 25, 2015

(54) HOLDER FOR A SPRING

(75) Inventors: Volker Wagner, Ravensburg (DE);
Gabriele Fruhmann, Bregenz (AT);
Stefan Lehmkuhl, Bad Rothenfelde (DE); Arnold Middelkampf, Badbergen (DE); Jorg Brandt, Vechta (DE); Holger Hoeckmann, Bad Essen (DE); Uwe Steinkamp, Osnabruck (DE); Norbert Schmudde, Badbergen (DE); Martin Rattay, Ravensburg (DE)

(73) Assignee: ZF Friedrichshafen, AG, Friedrichshafen (DE)

( * ) Notice: Subject to any disclaimer, the term of this patent is extended or adjusted under 35 U.S.C. 154(b) by 0 days.

(21) Appl. No.: 14/237,965

(22) PCT Filed: Jul. 5, 2012

(86) PCT No.: PCT/EP2012/063126
§ 371 (c)(1),
(2), (4) Date: Feb. 10, 2014

(87) PCT Pub. No.: WO2013/029846
PCT Pub. Date: Mar. 7, 2013

(65) Prior Publication Data
US 2014/0167339 A1 Jun. 19, 2014

(30) Foreign Application Priority Data
Aug. 29, 2011 (DE) .......................... 10 2011 081 693

(51) Int. Cl.
*F16F 1/368* (2006.01)
*F16F 1/26* (2006.01)
(Continued)

(52) U.S. Cl.
CPC . *F16F 1/26* (2013.01); *B60G 11/08* (2013.01); *F16F 1/3686* (2013.01); *F16F 7/123* (2013.01); *B60G 2202/114* (2013.01);
(Continued)

(58) Field of Classification Search
CPC ............. F16F 1/26; F16F 1/28; F16F 1/3683; F16F 1/3686; B60G 2204/121; B60G 11/10
See application file for complete search history.

(56) References Cited

U.S. PATENT DOCUMENTS

| 3,679,188 A * | 7/1972 | Trindle ........................... 267/52 |
| 3,971,550 A | 7/1976 | Matsuoka et al. |
| 4,322,061 A * | 3/1982 | Masser .......................... 267/269 |

(Continued)

FOREIGN PATENT DOCUMENTS

| EP | 0 218 322 A1 | 4/1987 |
| FR | 2 717 124 A1 | 9/1995 |

(Continued)

OTHER PUBLICATIONS

International Search Report Corresponding to PCT/EP2012/063126 Mailed Aug. 30, 2012.
(Continued)

*Primary Examiner* — Vishal Sahni
(74) *Attorney, Agent, or Firm* — Davis & Bujold, P.L.L.C.; Michael J. Bujold (57) ABSTRACT

A holder (5) for a spring (2) which has a spring fastening area (10) for fastening the spring (2) to the holder (5) and a wheel carrier fastening area (9) for fastening a wheel carrier (4) to the spring. The holder (5) further has a deformable zone (23) for transmitting force from the spring fastening area (10) to the wheel carrier fastening area (9).

18 Claims, 8 Drawing Sheets

(51) Int. Cl.
*B60G 11/08* (2006.01)
*F16F 7/12* (2006.01)

(52) U.S. Cl.
CPC .... *B60G 2204/121* (2013.01); *B60G 2204/148* (2013.01); *B60G 2206/016* (2013.01); *B60G 2206/15* (2013.01)

(56) References Cited

U.S. PATENT DOCUMENTS

| | | | | |
|---|---|---|---|---|
| 4,733,744 | A | * | 3/1988 | Glaze .......................... 180/256 |
| 4,781,364 | A | | 11/1988 | Finn et al. |
| 4,969,634 | A | * | 11/1990 | Bellingham ..................... 267/52 |
| 5,062,620 | A | | 11/1991 | Martone |
| 2003/0234506 | A1 | | 12/2003 | Yokoyama |
| 2011/0221105 | A1 | * | 9/2011 | Henksmeier et al. ........... 267/52 |
| 2014/0042680 | A1 | * | 2/2014 | Glover ......................... 267/158 |

FOREIGN PATENT DOCUMENTS

| | | |
|---|---|---|
| JP | 10-24861 A | 1/1998 |
| WO | 96/27507 A1 | 9/1996 |
| WO | 2009/121353 A1 | 10/2009 |

OTHER PUBLICATIONS

Written Opinion Corresponding to PCT/EP2012/063126 Mailed Aug. 30, 2012.

\* cited by examiner

HOLDER FOR A SPRING

This application is a National Stage completion of PCT/EP2012/063126 filed Jul. 5, 2012, which claims priority from German patent application serial no. 10 2011 081 693.3 filed Aug. 29, 2011.

FIELD OF THE INVENTION

The present invention relates to a holder for a spring, which comprises a spring fastening area for fastening the spring to the holder and a wheel carrier fastening area for fastening a wheel carrier to the holder.

BACKGROUND OF THE INVENTION

Springs, such as leaf springs, are often used in the chassis area for the spring suspension of wheels in order to compensate for bumps in the road and thereby improve the driving properties of a vehicle. For this purpose the wheels, or the wheel carriers to which the wheels can be fixed, are connected to the vehicle body by suspension control arms and springs. The springs can also guide and hold the wheels and/or the wheel carriers so that the wheels are positioned in a controlled position relative to the chassis and/or the vehicle body.

In the prior art, the leaf spring is connected to the wheel carrier by means of holders. Such holders can for example be simple screw-bolts, which pass through a hole in the leaf spring and are connected to the wheel carrier.

SUMMARY OF THE INVENTION

The object of the invention is to provide a holder for a leaf spring.

In particular, the objective is achieved by a holder for a spring, in particular a leaf spring, which comprises a spring fastening area for fixing the spring to the holder and a wheel carrier fastening area for fixing the wheel carrier to the spring, wherein the holder comprises a deformable zone for transmitting forces from the spring fastening area to the wheel carrier fastening area.

The wheel carrier fastening area is the part of the holder that serves for fastening the wheel carrier to the holder. The wheel carrier fastening area can also be connected to the wheel carrier by means of a number of further elements. The spring fastening area serves for fastening the spring to the holder. This area also does not have to be connected directly to the spring, but here as well one or more elements can be arranged between the holder and the spring.

Thus it has been recognized that instead of connecting the spring directly to the wheel carrier a separate holder can be associated with the spring, by means of which the spring is connected to the wheel carrier. In that case the holder does not have to be directly connected to the wheel carrier, but rather, designs are also conceivable in which one or more elements are arranged between the wheel carrier and the holder.

The spring can in particular be designed as a leaf spring, preferably a transverse leaf spring. A leaf spring is understood to mean a spring whose main direction of propagation differs from the preferred springing direction, in particular with the main direction of propagation being essentially perpendicular to the preferred springing direction.

The leaf spring can consist of one or more materials, in particular metal and/or plastic. Preferably, the leaf spring and/or transverse leaf spring is made of a glass fiber reinforced plastic.

In particular, the holder can be formed such that in the event of an energy input which could damage the spring, the holder is deformed so that the energy introduced is at least partially absorbed within the holder and only part of the energy introduced is transferred to the spring. This prevents damage to the spring. Preferably, the deformation of the holder is of a shape and size such that the spring remains connected to the wheel carrier by the holder and the wheel can therefore still be guided by the spring and driving can continue despite the deformation.

The force that could damage the spring can be determined having regard to the size, direction, duration etc. of the force. It is also possible to adapt the holder in such manner that damage to other components, in particular ones associated with the spring, such as bearings, is prevented.

It is particularly preferable, however, for the deformation of the holder to be clearly perceptible from the driving behavior of the vehicle so that the driver is made aware of the damage in the holder by the driving behavior and thus motivated to correct the damage. Thanks to the deformation taking place in the holder, damage of the spring is prevented, so that in the event of damage only the holder has to be replaced and the, in most cases substantially more expensive, spring itself can be retained.

Preferably, by virtue of the deformation of the holder, the position of the wheel carrier fastening to the holder relative to the fastening of the spring to the holder is displaced so that when the holder is in use the wheel position, such as its track and/or camber, changes.

Preferably the holder is made of metal, such as steel and/or aluminum. However, holders made of composite materials such as fiber-reinforced plastic, in particular glass fiber reinforced plastic, are also conceivable.

According to an example embodiment the deformable zone is designed to deform plastically if a force that exceeds a certain force limit, and in particular one which could result in damage to the spring, is transmitted from the wheel carrier fastening area to the spring fastening area. Due to its plastic deformation, the holder can be made such that the transmission of forces which are in a normal range hardly deforms the holder, or only slightly and elastically, thereby enabling stable and constant guiding of the wheels. If a force is exerted on the holder which is so large that the spring could be lastingly damaged, then the deformable zone of the holder is deformed plastically and the energy is absorbed by this plastic deformation and not, therefore, passed on to associated components such as the spring.

Preferably, the deformation of the deformable zone brings the wheel carrier fastening area closer to the spring fastening area. In this way the deformation can change the position of the wheel carrier relative to the spring. As a result of this position change of the holder, the wheels can move to a toe-in or toe-out position depending on the attachment of the holder to the wheel carrier. This leads to perceptibly altered driving behavior.

Preferably, the deformable zone is positioned so that a force transmitted from the wheel carrier fastening area to the spring fastening area passes by way of the deformable zone. In particular, the deformable zone can connect the wheel carrier fastening area to the spring fastening area.

Preferably, the deformable zone is located in the main direction of propagation of the spring between the wheel carrier fastening area and the spring fastening area. The spring fastening area is the area in which the spring is fastened to the holder. In its fastening area, the spring can be surrounded by the holder and thus held on many sides. Also, in the fastening area the holder can be connected detachably or permanently to the spring by means of a screw-bolt, a pin or a rivet. The wheel carrier fastening area is the area in which the holder is formed such that it can be connected indirectly or directly to the wheel carrier. The arrangement of the deformable zone between the wheel carrier fastening area and the spring fastening area, preferably along the main direction of propagation of the spring, enables the holder to be designed such that it acts as an extension of the spring. This allows the holder to be used even in suspension designs or chassis in which no, or no such holder is previously provided, since the holder can extend in the direction of the spring and so extends the shape of the spring.

However, it is also possible in the main direction of propagation of the spring to position the wheel carrier fastening area next to or offset relative to the spring fastening area, and thereby to enable the spring to be fitted in a variety of fitting spaces.

The holder can be produced by extrusion, but various other production methods are also conceivable.

Preferably, the holder comprises at least one strut which extends from the wheel carrier fastening area to the spring fastening area. The strut preferably has a smaller cross-section than the spring fastening area and/or the wheel carrier fastening area and/or a strut in the spring fastening area and/or a strut in the wheel carrier fastening area. The strut can be designed such that if too high a force is exerted in a direction that differs from its longitudinal direction, it will bend and thereby bring about a defined deformation of the holder. Preferably, the deformation of the holder takes place exclusively in its deformable zone. In this way deformation of the fastening areas, i.e. of the spring fastening area and/or the wheel carrier fastening area, and hence damage of the spring and/or the wheel carrier, is avoided.

Preferably, at least the strut of the deformable zone has a curvature which, in the event of a force overload, anticipates the deformation. This curvature is preferably in the direction perpendicular to a line connecting the spring and the wheel carrier.

Preferably, the strut of the deformable zone is plate-shaped. Here, plate-shaped can mean that an extension direction of the strut, for example its width, is longer than a second extension direction, which can in particular be perpendicular to the first extension direction. The second extension direction of the strut can for example be the thickness of the strut.

The shape of the strut can be adapted to the force to be transmitted. In particular the strut can have a direction in which it bends under a large force. Specifically, the cross-section of the strut can be particularly thin in the direction of the preferred bending. In particular, the cross-section in the bending direction can be smaller than in a direction perpendicular thereto, and particularly preferably the extension in the bending direction can be smaller than $1/10$ of the extension perpendicular thereto.

Preferably, particularly in its deformable zone the holder has two struts, which can also be arranged parallel to one another and/or mirror-symmetrically to one another. Preferably, these struts can have the same shape. The use of two struts enables a stable connection between the spring and the wheel carrier to be formed without having to use struts with particularly large cross-sections. Furthermore, the use of two struts gives improved resistance against forces that act perpendicularly to the main direction of propagation of the spring.

Preferably, the deformable zone comprises a plurality of struts. Thanks to this larger number of struts, for example three to ten or more struts, preferably six of them, the holder can be designed such that it can withstand high forces in various directions without deforming, thereby enabling the spring to be positioned in a stable manner relative to the wheel carrier. However, the struts also allow a defined deformation of the deformable zone if the deformation zone is exposed to large forces.

Preferably, the struts intersect in the deformable zone. Particularly preferably, two struts define the side surfaces of the holder in the deformable zone. In particular, the struts intersect at various points, preferably with only two struts in each case intersecting at any one point. With a plurality of struts in the deformable zone a lattice structure can also be provided. In that case one strut or two struts can form a boundary of the lattice structure.

Preferably, the struts have the same width as the holder so that the holder can be produced by extrusion and subsequent separation or isolation from the strand.

In a further embodiment, the deformable zone comprises a body with a honeycomb structure, in particular made of metal such as steel and/or aluminum. Such bodies can have a honeycomb structure wherein the cells have a preferred direction. Preferably, the cell walls extend perpendicularly to a common plane, so that a large force can be transmitted in the direction of the cell walls whereas plastic deformation of the cells can take place under a force perpendicular or at an angle to the cell wall direction. Thus, thanks to the honeycomb structure and the direction of its walls, a large force exerted at an angle to the cell wall direction can bend the deformable zone in a predetermined direction and/or deform it into itself and thereby change the distance and/or the position of the wheel carrier relative to the spring. This also changes the camber and/or the track of the wheel and thus also the driving behavior of the vehicle. The change of driving behavior signals to the driver that the chassis has been damaged and that some components, in particular the holder, should be replaced and/or repaired.

In a further embodiment, the deformable zone comprises a sponge-like element characterized by its spongy and/or foam-like structure. The sponge-like element can be arranged between two struts that define the lateral surfaces of the deformable zone. Preferably, the spongy element is made of a metallic foam such as aluminum foam. The spongy element can be formed as an element separate from the holder. The aluminum foam can also be cast into the deformable zone.

Preferably, the holder is made in one piece. A one-piece holder can be made simply and inexpensively. Thus, such a holder is also suitable for mass production.

It is also preferable for the holder to be made of metal, such as aluminum and/or steel. On the one hand such materials can easily be bent plastically without breaking, and on the other hand such materials are also suitable for the production of durable chassis components.

Preferably, the wheel carrier fastening area comprises a mounting such as a rubber mounting for fastening the wheel carrier to the holder. In particular, the fastening is an elastic fastening. Such a mounting serves to attach the wheel carrier to the holder in a movable manner so that, for example, the wheel can be guided and steered by the holder.

The mounting can be held by friction force in a preferably annular receiving fixture formed by the holder.

Also preferably, the spring fastening comprises a fixture in which the spring can be held. The spring holder can widen out in the direction of the deformable zone so that a corresponding spring, in particular one provided with a thicker portion at its end, can be held therein.

Preferably, the holder is part of a McPherson rear axle with a wheel-guiding transverse leaf spring. However, the holder can also be used in a different axle design with a wheel-guiding transverse leaf spring or longitudinal leaf spring and spring control arms or other chassis parts or components, in particular made of composite materials such as fiber-reinforced plastics.

BRIEF DESCRIPTION OF THE DRAWINGS

Below, the invention is explained in more detail with the help of the drawings and with reference to example embodiments.

The drawings show.

DETAILED DESCRIPTION OF THE PREFERRED EMBODIMENTS

Figure 1:
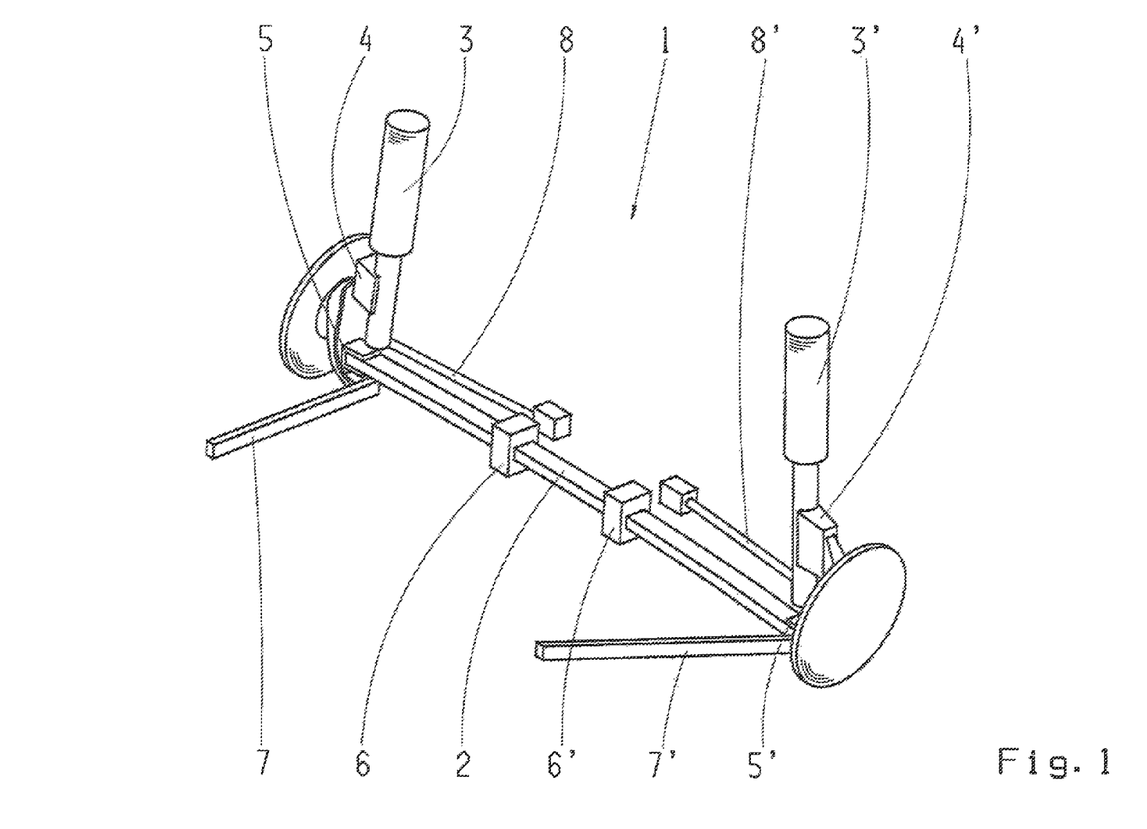
FIG. 1: A chassis.

FIG. 1 shows part of a chassis 1, as can be used for example as the rear axle in a passenger car. The chassis has two wheel carriers 4, 4' to which wheels can be fixed via wheel bearings. To the wheel carriers 4, 4' are fixed in each case respective longitudinal control arms 7, 7' and transverse control arms 8, 8'. The longitudinal control arms 7, 7' extend substantially in the longitudinal direction of the vehicle and the transverse control arms 8, 8' substantially in the transverse direction of the vehicle. The transverse and longitudinal control arms are in each case attached at one end to the respective wheel carriers, while the other end is mounted on the vehicle body.

In addition the chassis has two dampers 3, 3' which are also connected at one end to the wheel carriers whereas the other ends of the dampers 3, 3' are connected to the vehicle body by mountings.

While the control arms 7, 7' and 8, 8' determine the movement path of the wheel carriers 4, 4' relative to the vehicle body, the dampers additionally dampen the movement of the wheel carriers relative to the body for wheel guiding purposes.

From left to right, the chassis 1 comprises the following components: wheel carrier 4, holder 5, transverse leaf spring 2, longitudinal control arm 7, damper 3, transverse control arm 8, leaf spring holder 6, leaf spring holder 6', transverse control arm 8', damper 3', longitudinal control arm 7', holder 5', wheel carrier 4'.

The two wheel carriers 4, 4' are connected by a spring 2, in particular a transverse leaf spring, which preferably consists of a composite material such as glass-fiber-reinforced plastic. The transverse leaf spring 2 extends transversely to the vehicle's main axis, i.e. as a rule transversely to the driving direction, and is connected to the vehicle body by means of two leaf spring holders arranged in the central one-third portion of the transverse leaf spring 2. The transverse leaf spring is connected at its ends to the wheel carriers 4, 4' by holders 5, 5.

Figure 2:
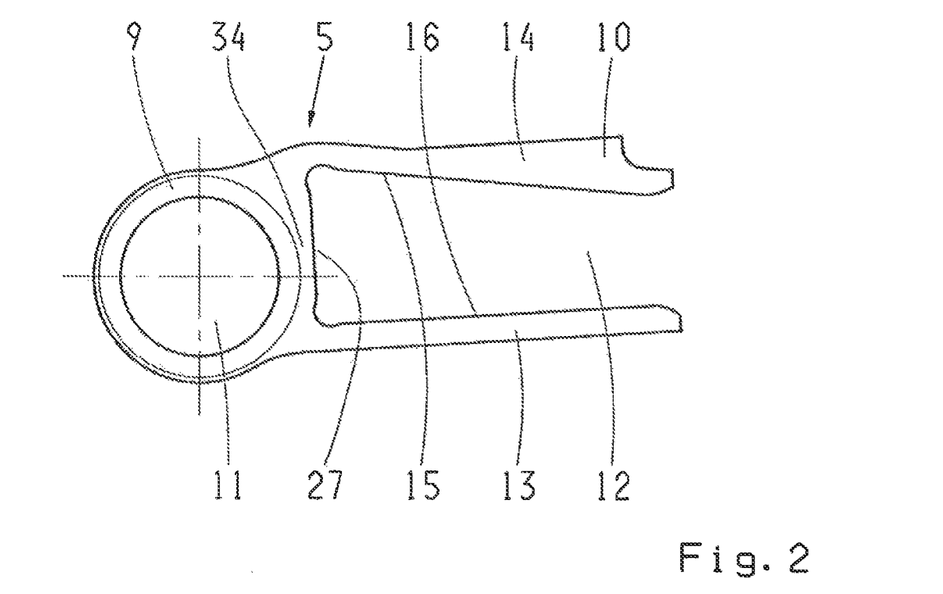
FIG. 2: A holder.

FIG. 2 shows a holder 5, 5' comprising a wheel carrier fastening area 9 and a spring fastening area 10. The holder 5 is made of a metal such as aluminum. The wheel carrier fastening area 9 has an annular, central opening 11 which can hold a mounting for fastening the wheel carrier to the holder 5. The spring fastening area 10 has two opposite flanges 13 and 14, which form a recess 12 in which the spring 2 can be held. In this case the wheel carrier fastening area 9 is arranged next to the spring fastening area 10, and separated from it by the wall 34.

Figure 3:
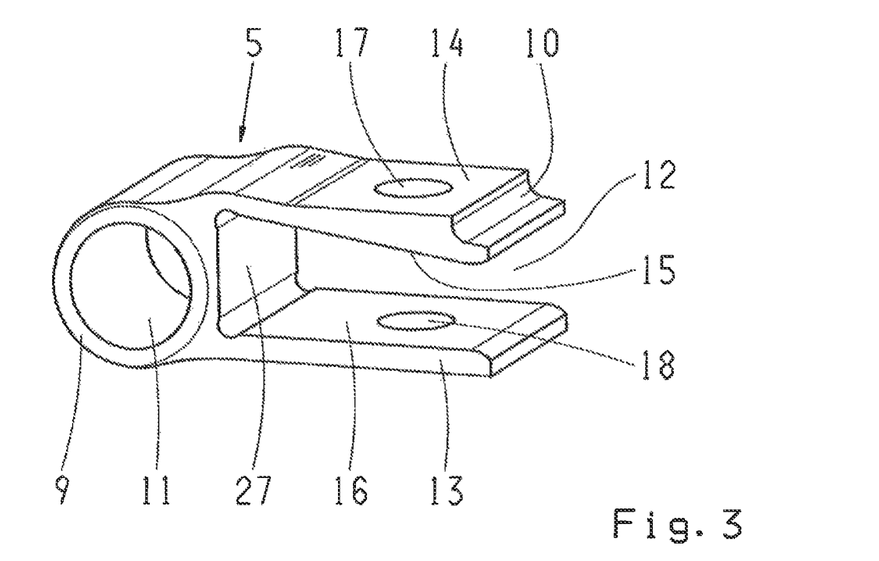
FIG. 3: The holder of FIG. 2, in a three-dimensional representation.

FIG. 3 shows a perspective representation of the holder 5 in FIG. 2. The spring fastening area 10 has the two flanges 13 and 14, each with a respective inside surface 15, 16, which are in contact with the spring 2 when the spring 2 is held. The inside surfaces 15, 16 are connected by the front inside surface 27 of the wall 34, which is also in contact with the spring 2 when the latter is held in the recess 12. In this case the front inside surface 27 is perpendicular to the inside surface 16. The two flanges 13 and 14 each have a respective through-bore 17 and 18 extending perpendicularly to their outside surfaces. The two bores 17, 18 are aligned with one another.

Figure 4:
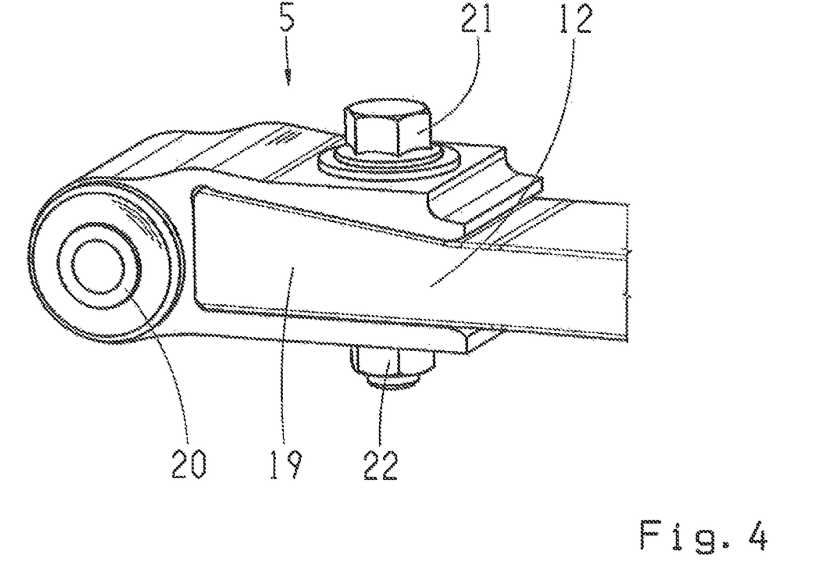
FIG. 4: A holder as of FIG. 2, in combination with a transverse leaf spring and a mounting.

FIG. 4 shows the holder 5 together with one end 19 of the spring 2 and a mounting 20. The end 19 of the spring 2 is fitted into the recess 12 formed by the inside surfaces 15 and 16 of the flanges 13 and 14 and by the front inside surface 27. The end 19 of the spring 2 has a hole (not visible) through which a screw-bolt 21 passes. The bolt 21 passes through the bores 17 and 18 of the flanges 13 and 14, and is secured by a nut 22. The bolt 21 secures the position of the spring 2 in the recess 12.

In the wheel carrier fastening area 9 there is arranged a rubber mounting 20, which is held fast in the holder 5 by friction force. The rubber mounting 20 can be connected to the wheel carrier 4 by screw coupling.

Figure 5:
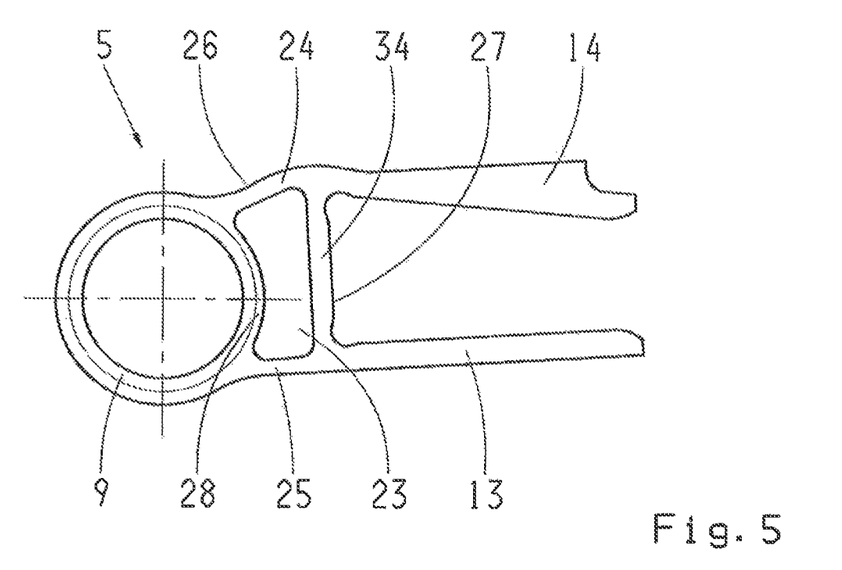
FIG. 5: Another holder.

FIG. 5 shows another design of a holder 5. In this case, between the wheel carrier fastening area 9 and the spring fastening area 10 there is a deformable zone 23, which is designed to deform as soon as a force is exerted on the wheel carrier fastening area 9 and/or the spring fastening area 10, which force exceeds a certain force limit. Advantageously, the force limit is lower than a force that would damage the spring 2.

In this case the deformable zone 23 consists of two struts 24 and 25 arranged opposite one another, which connect the wheel carrier fastening area 9 to the spring fastening area 10. The struts 24 and 25 preferably have the same width as the flanges 13 and 14, but are different in their thickness so that above a certain force limit the struts 24 and 25 will bend. The lower strut 25 connects the wheel carrier fastening area 9 straight to the spring fastening area 10, whereas the upper strut 24 is curved outward perpendicularly to its outside surface 26, so that in the event of an excessive force the deformation is at least partially predetermined. The deformable zone 23 is bounded on one side by the wheel carrier fastening area 9, in particular its wall 28, and on the other side by a wall 34, the wall 34 also forming the front inside surface 27.

Figure 6:
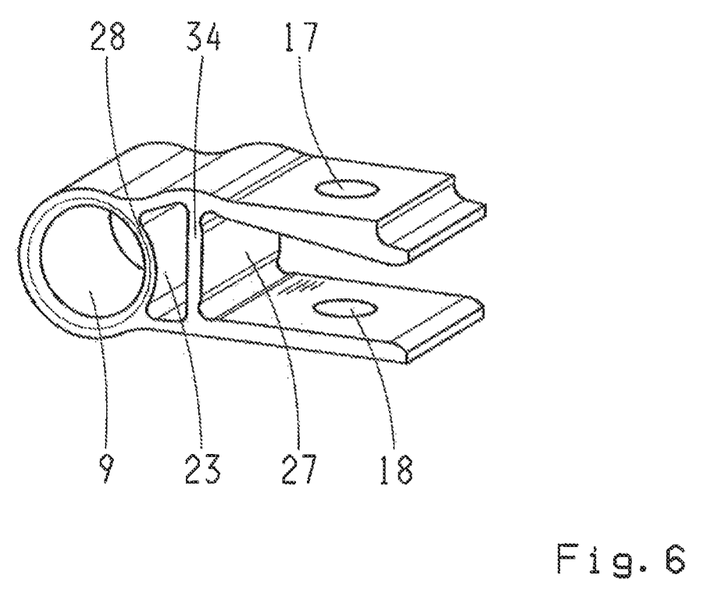
FIG. 6: The holder of FIG. 5, in a three-dimensional representation.

FIG. 6 shows a perspective view of the embodiment in FIG. 5. It can be seen that the wheel carrier fastening area 9 and the deformable zone 23 and the spring fastening area 10 all have the same width. Also visible are the holes 17 and 18 by virtue of which the spring 2 can be fixed to the holder 5 by means of a screw-bolt 21.

Figure 7:
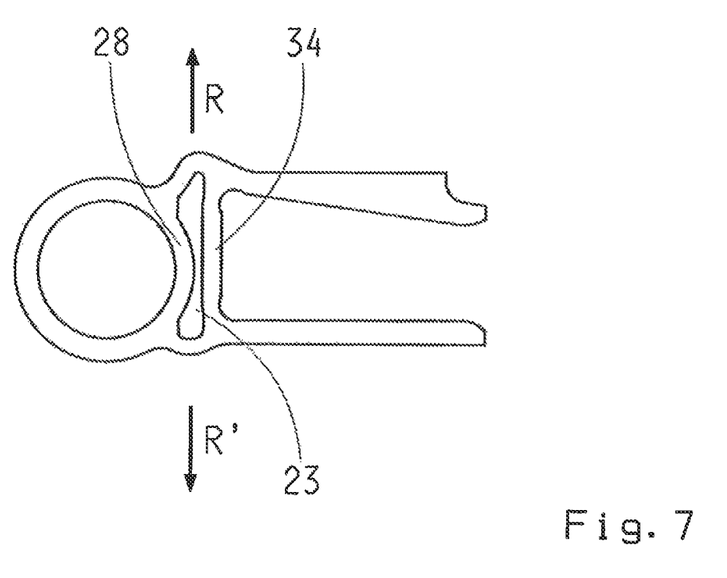
FIG. 7: The holder of FIG. 5, after deformation.

FIG. 7 shows the holder after it has been deformed by an excessive force. In this case the two struts 24 and 25 have been bent outward in the directions R and R'. During this the wheel carrier fastening area 9 has moved closer to the spring fastening area 10. This results in displacement or pivoting of the wheel carrier 4 relative to the vehicle body. However, the wheel carrier fastening area 9 is not displaced sideways, or only minimally so, relative to the spring fastening area 10 in the direction perpendicular to the force.

Figure 8:
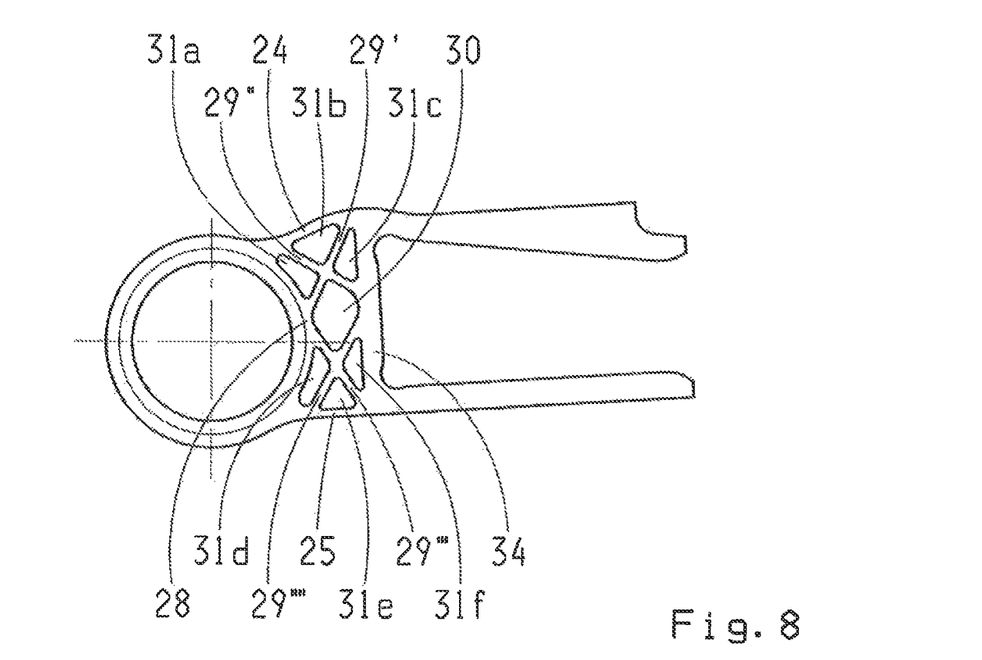
FIG. 8: A further holder.

FIG. 8 shows a further embodiment of a holder 5. In this case the struts 24 and 25 have a smaller thickness than the flanges 13 and 14, and are connected by further struts 29 to the wall 28 and the wall 34. The struts 29 have the same width as the struts 24 and 25 and are arranged at an angle to the struts 24 and 25, being inclined at approximately 45° to the struts 24 and 25. A strut 29' connects to the strut 24 to the wall 28, a strut 29" connects the strut 24 to the wall 34, a strut 29'" connects the strut 25 to the wall 28 and a strut 29"" connects the strut 25 to the wall 34. The struts 29' and 29" and the struts 29'" and 29"" are connected to and cross one another. Owing to this arrangement of struts an intermediate space 30 with a quadrangular cross-section is formed in the middle of the deformable zone, adjacent to six intermediate spaces 31a, 31b, 31c, 31d, 31e, 31f with substantially triangular cross-sections.

Figure 9:
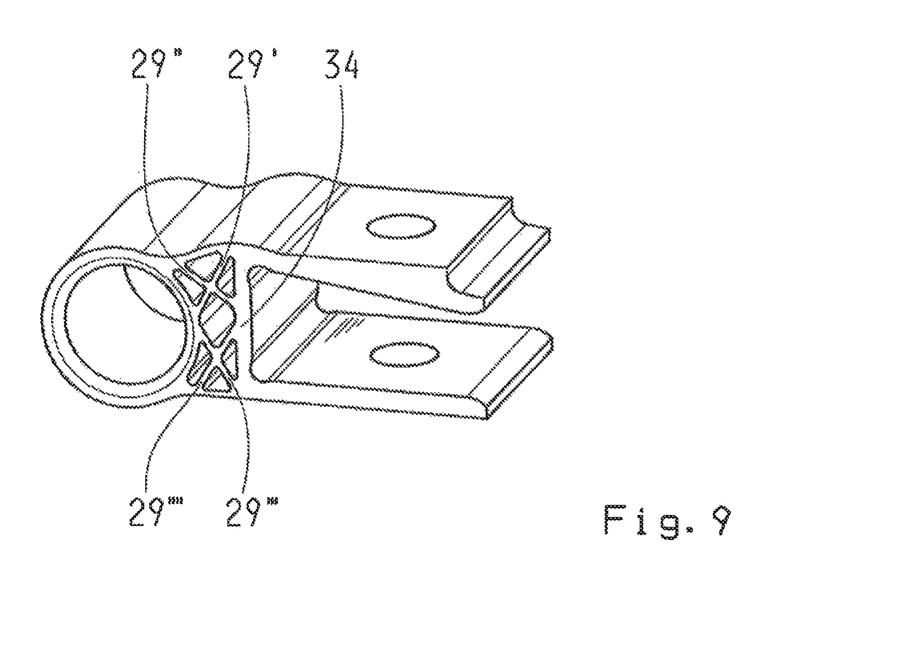
FIG. 9: The holder of FIG. 8, in a three-dimensional representation.

FIG. 9 shows a perspective view of the holder 5 of FIG. 8. In the figure the flat form of the struts 29', 29", 29'" and 29"" can also be seen.

Figure 10:
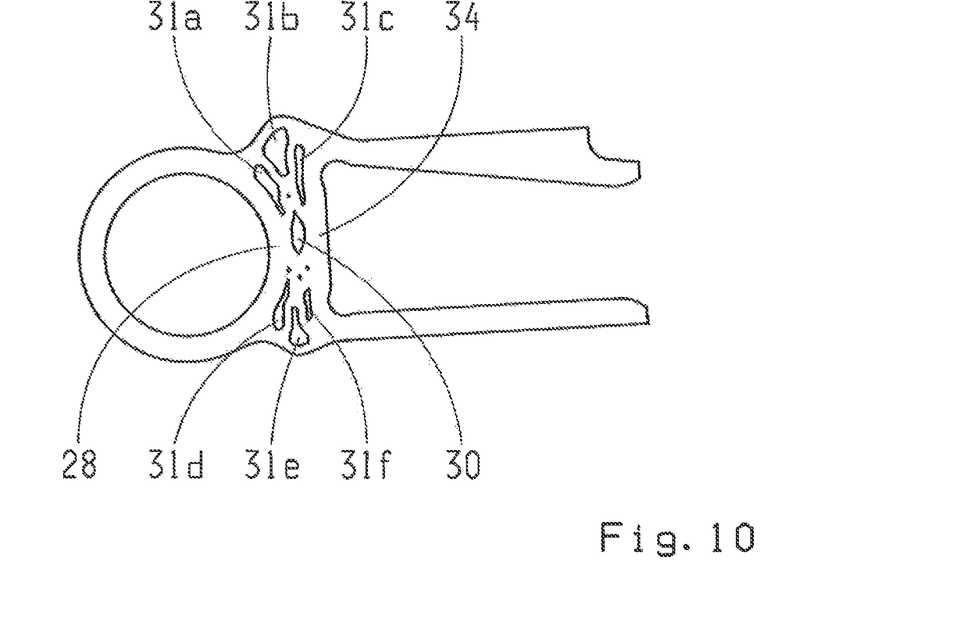
FIG. 10: The holder of FIG. 8, after deformation.

FIG. 10 shows the holder 5 of FIG. 8 after it has been deformed due to the application of excessive force. The struts 24 and 25 are again bent outward so that the wheel carrier fastening area moves closer to the spring fastening area. During this the intermediate spaces 30 and 31a to 31f are deformed and become smaller.

Figure 11:
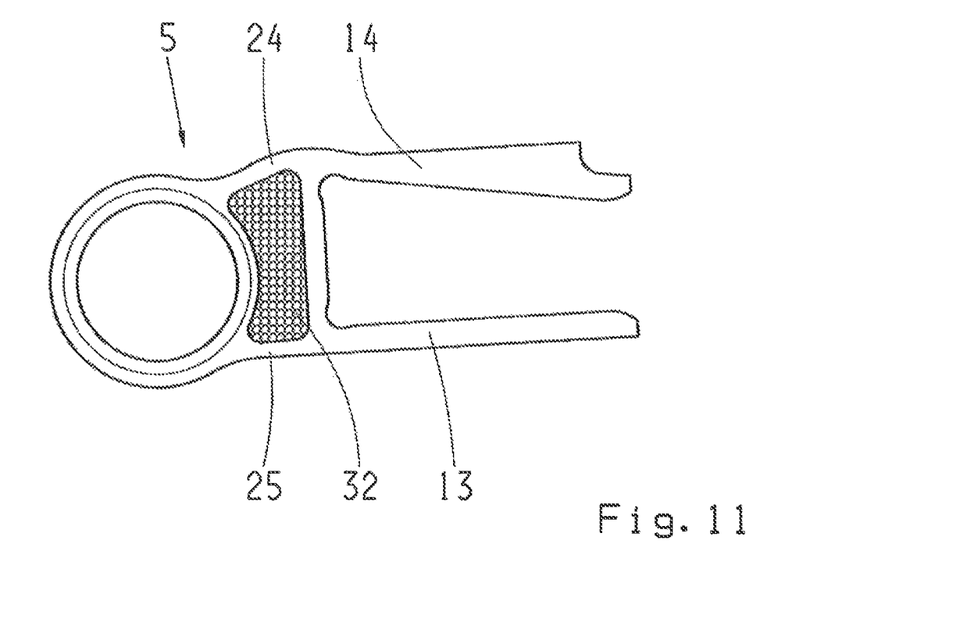
FIG. 11: A holder with a partially spongy deformation zone.

FIG. 11 shows another holder 5, this time with a foam-like structure 32, for example made of aluminum, in the deformable zone. The struts 24 and 25 can have a smaller thickness than the flanges 13 and 14. If the holder 5 is produced by extrusion, foaming of the aluminum foam can be integrated directly in the extrusion process. Alternatively, the aluminum foam can be formed after extrusion. Preferably, this can be done before cutting into the individual holders 5 and before the finish machining of the holder 5.

Figure 12:
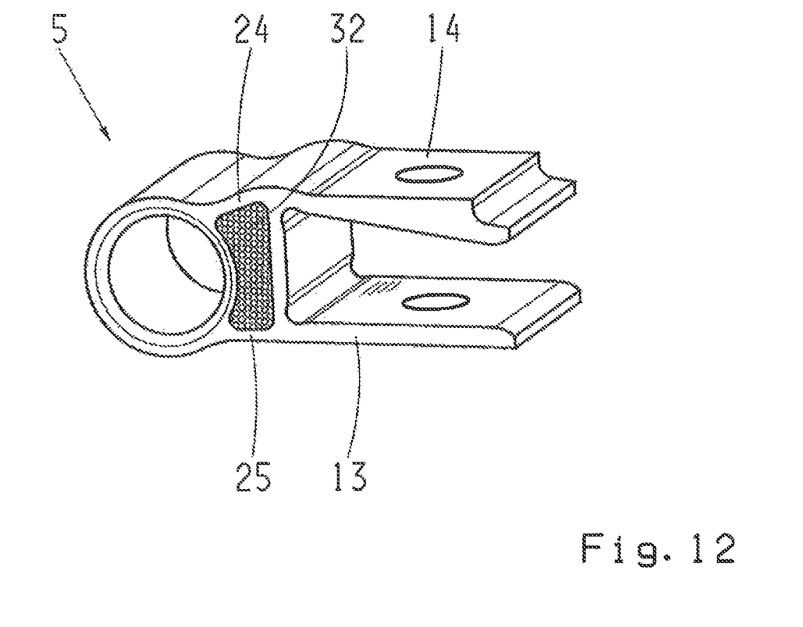
FIG. 12: A holder as in FIG. 11, represented in perspective.

FIG. 12 shows the holder 5 according to the embodiment of FIG. 11, in a perspective view.

Figure 13:
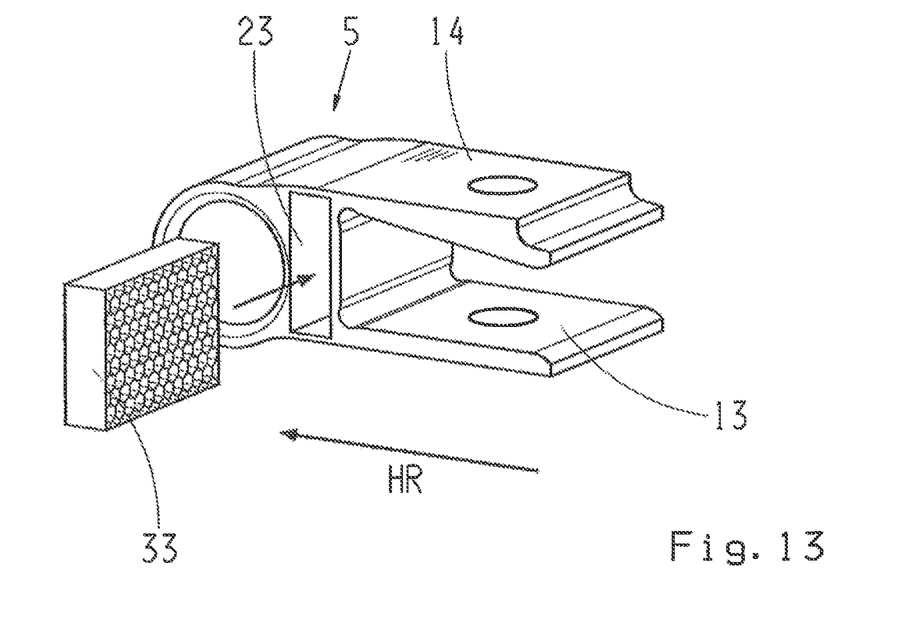
FIG. 13: A further embodiment of the holder.

FIG. 13 shows a further embodiment of a holder 5, wherein the holder 5 comprises a separate deformable component 33 that can be inserted into the deformable zone 23. The deformable component 33 can also be made of aluminum or another metal. Deformable components 33 made of other materials such as plastic are also possible. The deformable component 33 has a honeycomb structure with the cells extending in the main direction of propagation HR of the holder 5, i.e. from the spring fastening area 10 toward the wheel carrier fastening area 9.

Figure 14:
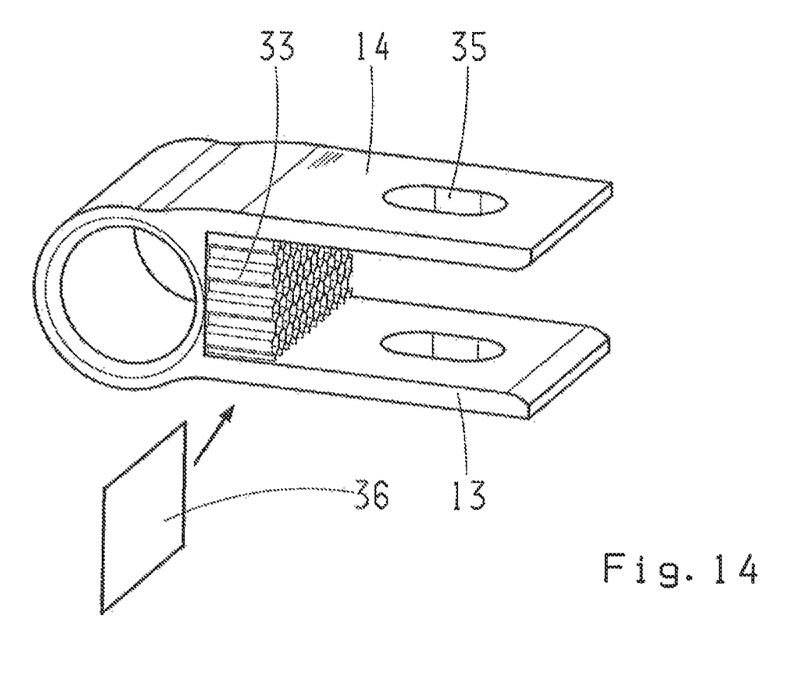
FIG. 14: Another embodiment of a holder.

FIG. 14 shows another embodiment of a holder 5. In this case the holder has in its flanges 13 and 14 two slots by virtue of which the spring 2 is guided by one or more screw-bolts. In addition, in the spring fastening area in the direction of the wheel carrier fastening area 9 the holder 5 has a deformable component 33. The spring 2 is in contact with the deformable component 33. If now an excessive force is transmitted from the wheel carrier fastening area 9 to the spring fastening area 10, the spring slides against the deformable component 33 and deforms that component 33. To distribute the force more uniformly from the deformable zone to the spring, a cover-plate 36 is arranged in the recess 12 between the deformable component 33 and the spring 2, which covers the deformable element 33 relative to the spring 2 and is arranged so that it can move within the recess 12. Thus, the spring 2 moves farther in the direction toward the wheel carrier fastening area 9 and thereby displaces the wheel carriers 4. During this the excessive force is absorbed by the deformation of the deformable component 33. The deformable component 33 can have a honeycomb structure, but also a sponge-like or foam-like structure.

Figure 15:
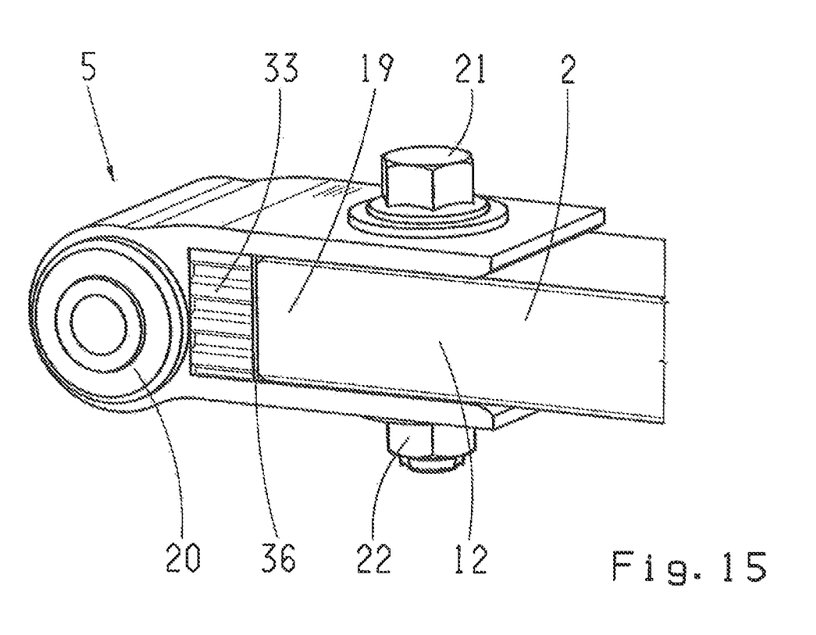
FIG. 15: A holder as in FIG. 14, with a spring.

FIG. 15 shows the embodiment of the holder 5 in FIG. 14 with a spring 2 and a rubber mounting. In this case a screw-bolt 21 passes through the spring 2 and is held in the slots 35. The deformable component 33 is arranged in the spring fastening area 10 between the wheel carrier fastening area 9 and the spring fastening area 10 and separated from the spring 2 by a cover-plate 36, so that the spring 2 is not damaged by the structure of the deformable component 33. Preferably, the spring is not touched by the screw-bolt so that here too there can be no damage to the spring. In particular, the spring is clamped by the spring fastening area and thus held fast.

Indexes

1 Chassis
2 Transverse leaf spring
3, 3' Damper
4, 4' Wheel carrier
5, 5' Holder
6, 6' Leaf spring holder
7, 7' Longitudinal control arm
8, 8' Transverse control arm
9 Wheel carrier fastening area
10 Spring fastening area
11 Opening
12 Recess
13 Flange
14 Flange
15 Inside surface
16 Inside surface
17 Through-bore
18 Through-bore
19 End of the spring
20 Rubber mounting
21 Screw-bolt
22 Nut
23 Deformable zone
24 Flange
25 Flange
26 Outside surface
27 Front inside surface
28 Wall
29 Wall
29' Wall
29" Wall
29'" Wall
29"" Wall
31a Intermediate space
31b Intermediate space
31c Intermediate space
31d Intermediate space
31e Intermediate space
31f Intermediate space
32 Spongy-like structure
33 Deformable component
34 Wall
35 Slots
36 Cover

The invention claimed is:

1. A holder (5) for a leaf spring (2), the holder comprising:
a spring fastening area (10) comprising flanges which define the recess, the recess receives an end of the spring and the flanges directly abut and sandwich the end of the spring therebetween for fastening the spring (2) to the holder (5),
a wheel carrier fastening area (9) for fastening a wheel carrier (4) to the spring,
the holder (5) having a deformable zone (23) for transmitting force from the spring fastening area (10) to the wheel carrier fastening area (9), and the spring fastening area, the wheel carrier fastening area and the deformation zone being formed from a common material, and
the deformable zone (23) comprises struts (24, 25, 29) which extend from the wheel carrier fastening area (9) to the spring fastening area (10), a wall which is formed from the common material extends between the flanges and further defines the recess, and the holder has an opening that is delimited by the struts, the wall and the wheel carrier fastening area.

2. The holder (5) for the spring (2) according to claim 1, wherein the deformable zone (23) is designed such that the deformable zone (23) deforms if a force that exceeds a force limit is transmitted from the wheel carrier fastening area (9) to the spring fastening area (10).

3. The holder (5) for the spring (2) according to claim 1, wherein the deformable zone (23) is located between the wheel carrier fastening area (9) and the spring fastening area (10) and a planar wall extends between the flanges and is formed from the common material.

4. The holder (5) for the spring (2) according to claim 1, wherein at least one further strut (24, 25, 29) extends between two of the struts, the wall and the wheel carrier fastening area and divides the opening into intermediate open spaces.

5. The holder (5) for the spring (2) according to claim 2, wherein the holder (5) has two struts (24, 25) which extend from the wheel carrier fastening area (9) to the spring fastening area (10) and which at least partially delimit an open space that is located between the wheel carrier fastening area and the recess defined by the flanges.

6. The holder (5) for the spring (2) according to claim 1, wherein the opening in the deformable zone (23) comprises at least one of a sponge-like and a foam-like body.

7. The holder (5) according to claim 1, wherein the holder (5) is made in one piece from the common material.

8. The holder (5) according to claim 1, wherein the holder comprises a deformable component (33).

9. The holder (5) for the spring (2) according to claim 1, wherein the common material is at least one of metal, aluminum, a fiber-composite material and plastic.

10. The holder (5) for the spring (2) according to claim 1, wherein the wheel carrier fastening area (9) comprises a mounting for attaching the wheel carrier (4, 4') to the holder (5), the mounting being friction fit with the wheel carrier fastening area.

11. The holder (5) for the spring (2) according to claim 1, wherein the spring fastening area (10) comprises the recess (12) for holding the spring (2), and one of the flanges slopes toward the other one of the flanges from an end adjacent the wheel carrier fastening area to an opposite end thereof.

12. The holder (5) according to claim 1, wherein the spring (2) is held by the holder (5) such that the spring is movable with respect to the holder.

13. The holder (5) according to claim 12, further comprises a deformable component (33) which impedes movement of the spring (2), in a displacement direction, with respect to the holder.

14. The holder according to claim 12, wherein the wall is a movable plate and the deformable component (33) is separated from the spring (2) by the movable plate.

15. A holder for a leaf spring of a vehicle, the leaf spring extending laterally with respect to a longitudinal axis of the vehicle, the holder comprising:
a spring fastening area of the holder formed by two flanges, and the two flanges extending from a wheel carrier fastening area of the holder, a wall separates the spring fastening area from the wheel carrier fastening area, the two flanges and an inside surface of the wall defining a recess which receives an end of the leaf spring for fastening the holder to the leaf spring;
the wheel carrier fastening area comprising a central opening that receives a wheel carrier of the vehicle such that the holder fastens the wheel carrier to the leaf spring; and
a deformable zone of the holder being located between the spring fastening area and the wheel carrier fastening area, the deformable zone comprising ends of the two flanges that are fixed to the wheel carrier fastening area, the ends of the flanges having a reduced cross-sectional thickness that is smaller than a cross-sectional thickness of the two flanges such that the deformable zone facilitates absorption of force transmitted between the leaf spring and the wheel carrier, and deforms when the force transmitted between the leaf spring and the wheel carrier exceeds a force limit, and the two flanges, the wall, the wheel carrier fastening area and the deformable zone are integrally formed from a common material; and
the deformable zone (23) comprises struts (24, 25, 29) which extend from the wheel carrier fastening area (9) to the spring fastening area (10), the wall which is formed from the common material extends between the two flanges and comprises the inside surface which partially defines the recess, and the holder has an opening that is delimited by the struts, the wall and the wheel carrier fastening area.

16. The holder according to claim 15, wherein the two flanges and the inside surface of the wall directly contact the leaf spring when the end of the leaf spring is received within the recess.

17. The holder according to claim 15, wherein one of the two flanges slopes toward the other of the two flanges from an end thereof connected to the wheel carrier fastening area to an opposite end thereof remote from the wheel carrier fastening area.

18. The holder according to claim 15, wherein the two flanges each comprise a through hole which are coaxially aligned with a bore in the leaf spring when the end of the leaf spring is received within the recess, the through holes receive a connector which passes through the bore in the leaf spring to fix the leaf spring relative to the two flanges.

* * * * *